United States Patent
Spotnitz et al.

(10) Patent No.: US 9,843,027 B1
(45) Date of Patent: Dec. 12, 2017

(54) BATTERY CELL HAVING PACKAGE ANODE PLATE IN CONTACT WITH A PLURALITY OF DIES

(75) Inventors: Robert Spotnitz, Pleasanton, CA (US); Ashok Lahiri, Cupertino, CA (US)

(73) Assignee: ENOVIX CORPORATION, Fremont, CA (US)

( * ) Notice: Subject to any disclaimer, the term of this patent is extended or adjusted under 35 U.S.C. 154(b) by 264 days.

(21) Appl. No.: 12/903,082

(22) Filed: Oct. 12, 2010

Related U.S. Application Data (63) Continuation of application No. 12/882,087, filed on Sep. 14, 2010, now abandoned.

(51) Int. Cl.
| | |
|---|---|
| *H01M 2/10* | (2006.01) |
| *H01M 4/04* | (2006.01) |
| *H01M 2/24* | (2006.01) |
| *H01M 10/058* | (2010.01) |
| *H01M 4/02* | (2006.01) |
| *H01M 10/0525* | (2010.01) |

(52) U.S. Cl.
CPC ........... *H01M 2/1077* (2013.01); *H01M 2/24* (2013.01); *H01M 4/0421* (2013.01); *H01M 10/058* (2013.01); *H01M 10/0525* (2013.01); *H01M 2004/025* (2013.01)

(58) Field of Classification Search
None
See application file for complete search history.

(56) References Cited

U.S. PATENT DOCUMENTS

| 4,113,579 A | 2/1978 | Randall |
| 4,820,599 A | 4/1989 | Furukawa et al. |

(Continued)

FOREIGN PATENT DOCUMENTS

| CA | 02388711 | 5/2001 |
| CN | 1286811 | 3/2001 |

(Continued)

OTHER PUBLICATIONS

Machine translation for Tsuchiya, JP 11-233076 A.*

(Continued)

*Primary Examiner* — Barbara Gilliam
*Assistant Examiner* — Robert S Carrico
(74) *Attorney, Agent, or Firm* — Bryan Cave LLP (57) ABSTRACT

Certain embodiments of the invention relate to the design of three-dimensional battery cells and their incorporation into battery modules and battery packs. The present invention may be particularly advantageous when incorporated into large battery packs, for example, those used in electric vehicles. The unique architecture of the battery cells of certain embodiments of the invention provides improved thermal performance with significant impact on cycle and calendar life when incorporated into a battery pack. Substantially higher pack energy density for a given cell energy density is provided when compared to a conventional cell. Battery cells can be strung together to form modules and packs with whatever series/parallel arrangement required for a particular application. Cooling, if needed, can be incorporated at the module level rather than the individual die level, as is the case with conventional architectures, dramatically reducing the cost of the system.

16 Claims, 10 Drawing Sheets

(56) References Cited

U.S. PATENT DOCUMENTS

| | | |
|---|---|---|
| 4,996,129 A | 2/1991 | Tuck |
| 5,238,759 A | 8/1993 | Plichta et al. |
| 5,294,504 A | 3/1994 | Otagawa |
| 5,709,962 A | 1/1998 | Bailey |
| 5,993,990 A | 11/1999 | Kanto et al. |
| 6,090,505 A | 7/2000 | Shimamura et al. |
| 6,235,427 B1 | 5/2001 | Idota et al. |
| 6,287,371 B1 | 9/2001 | Ota et al. |
| 6,432,579 B1 | 8/2002 | Tsuji et al. |
| 6,432,585 B1 | 8/2002 | Kawakami |
| 6,495,283 B1 | 12/2002 | Yoon et al. |
| 6,498,406 B1 | 12/2002 | Horiuchi |
| 6,525,391 B1 | 2/2003 | Bertrand et al. |
| 6,679,925 B1 | 1/2004 | Tanizaki et al. |
| 6,791,737 B2 | 9/2004 | Giron |
| 6,821,673 B1 | 11/2004 | Hamada et al. |
| 6,833,010 B2 | 12/2004 | Asahina et al. |
| 6,878,173 B2 | 4/2005 | Miyahisa |
| 7,056,455 B2 | 6/2006 | Matyjaszewski |
| 7,066,971 B1 | 6/2006 | Carlson |
| 7,153,609 B2 | 12/2006 | Kubo et al. |
| 7,309,548 B2 | 12/2007 | Ota et al. |
| 7,402,829 B2 | 7/2008 | Green |
| 8,101,298 B2 | 1/2012 | Green et al. |
| 8,192,788 B1 | 6/2012 | Shah et al. |
| 8,475,957 B2 | 7/2013 | Rust, III et al. |
| 8,527,395 B2 | 9/2013 | Ramasubramanian et al. |
| 8,841,030 B2 | 9/2014 | Lahiri et al. |
| 9,356,271 B2 | 5/2016 | Ramasubramanian et al. |
| 9,362,553 B2 | 6/2016 | Lahiri et al. |
| 2002/0013986 A1 | 2/2002 | Ahn et al. |
| 2002/0034685 A1 | 3/2002 | Sato et al. |
| 2002/0039283 A1 | 4/2002 | Nakamura et al. |
| 2002/0064708 A1* | 5/2002 | Asahina et al. ............ 429/160 |
| 2002/0074972 A1* | 6/2002 | Narang et al. ................ 320/131 |
| 2002/0136957 A1 | 9/2002 | Zhang et al. |
| 2003/0082446 A1 | 5/2003 | Chiang et al. |
| 2004/0092395 A1 | 5/2004 | Hase et al. |
| 2004/0185336 A1 | 9/2004 | Ito et al. |
| 2004/0214079 A1 | 10/2004 | Simburger et al. |
| 2004/0214085 A1 | 10/2004 | Sheem et al. |
| 2004/0234861 A1 | 11/2004 | Kawase et al. |
| 2004/0241540 A1 | 12/2004 | Tsutsumi et al. |
| 2005/0008939 A1 | 1/2005 | Ota |
| 2005/0079418 A1 | 4/2005 | Kelley et al. |
| 2005/0079420 A1* | 4/2005 | Cho ................... H01M 4/0402 429/231.95 |
| 2005/0095503 A1 | 5/2005 | Adachi et al. |
| 2005/0130383 A1 | 6/2005 | Divakaruni et al. |
| 2005/0208379 A1 | 9/2005 | Musha et al. |
| 2006/0093871 A1 | 5/2006 | Howard |
| 2006/0121342 A1* | 6/2006 | Sano et al. .................. 429/162 |
| 2006/0154141 A1 | 7/2006 | Salot et al. |
| 2006/0188784 A1 | 8/2006 | Sudoh et al. |
| 2006/0269845 A1 | 11/2006 | Xu et al. |
| 2006/0281007 A1 | 12/2006 | Tsutsumi et al. |
| 2007/0002523 A1 | 1/2007 | Ando et al. |
| 2007/0037053 A1* | 2/2007 | Anantharaman ....... H01M 2/02 429/176 |
| 2007/0059584 A1 | 3/2007 | Nakano et al. |
| 2007/0092792 A1* | 4/2007 | Kasahara et al. ............ 429/161 |
| 2007/0097481 A1 | 5/2007 | Burdis et al. |
| 2007/0172732 A1 | 7/2007 | Jung et al. |
| 2007/0243460 A1 | 10/2007 | Carlson et al. |
| 2008/0003490 A1 | 1/2008 | Christensen |
| 2008/0032170 A1 | 2/2008 | Wainwright et al. |
| 2008/0081256 A1 | 4/2008 | Madou et al. |
| 2008/0081257 A1 | 4/2008 | Yoshida et al. |
| 2008/0233455 A1 | 9/2008 | Deimede |
| 2009/0035664 A1 | 2/2009 | Chiang et al. |
| 2009/0068567 A1 | 3/2009 | Konishiike et al. |
| 2009/0117472 A1 | 5/2009 | Iwamoto |
| 2009/0123847 A1 | 5/2009 | Okada et al. |
| 2009/0142656 A1 | 6/2009 | Nathan et al. |
| 2009/0263716 A1 | 10/2009 | Ramasubramanian et al. |
| 2009/0303660 A1 | 12/2009 | Nair et al. |
| 2010/0003603 A1* | 1/2010 | Chiang et al. ............ 429/231.95 |
| 2010/0040951 A1 | 2/2010 | Yamamoto et al. |
| 2010/0051856 A1 | 3/2010 | Kim et al. |
| 2010/0119939 A1 | 5/2010 | Misumi et al. |
| 2010/0209775 A1 | 8/2010 | Kim |
| 2010/0266907 A1 | 10/2010 | Yazami |
| 2010/0285368 A1 | 11/2010 | Yamamato et al. |
| 2011/0014522 A1 | 1/2011 | Visco et al. |
| 2011/0020701 A1 | 1/2011 | Park et al. |
| 2011/0020713 A1 | 1/2011 | Cui et al. |
| 2011/0020719 A1 | 1/2011 | Manabe et al. |
| 2011/0067228 A1 | 3/2011 | Green |
| 2011/0111283 A1 | 5/2011 | Rust, III et al. |
| 2011/0129732 A1 | 6/2011 | Bachrach et al. |
| 2011/0171518 A1 | 7/2011 | Dunn et al. |
| 2012/0176093 A1 | 7/2012 | Ramasubramanian et al. |
| 2013/0143120 A1 | 6/2013 | Amasubramanian et al. |
| 2013/0189602 A1 | 7/2013 | Lahiri et al. |
| 2013/0230751 A1 | 9/2013 | Shaw |
| 2014/0335395 A1 | 11/2014 | Ramasubramanian et al. |

FOREIGN PATENT DOCUMENTS

| | | | |
|---|---|---|---|
| CN | 1555588 | 12/2004 | |
| EP | 0883199 | 12/1998 | |
| EP | 1028476 | 8/2000 | |
| EP | 1100134 | 5/2001 | |
| EP | 1102340 | 5/2001 | |
| EP | 2048262 | 4/2009 | |
| EP | 2277214 | 10/2009 | |
| JP | 11233076 A * | 8/1999 | ............ H01M 2/02 2/20 |
| JP | 2003323882 | 11/2003 | |
| JP | 2006286427 | 10/2006 | |
| JP | 2008153033 A | 7/2008 | |
| JP | 2008153034 A | 7/2008 | |
| JP | 2008153035 A | 7/2008 | |
| JP | 2008153036 A | 7/2008 | |
| KR | 20030044508 | 6/2003 | |
| NL | 1015956 | 2/2002 | |
| WO | 0243168 A2 | 5/2002 | |
| WO | 03105258 | 12/2003 | |
| WO | WO 2005119812 A1 * | 12/2005 | ............ H01M 2/00 |
| WO | 2008030215 | 3/2008 | |
| WO | 2008072638 A1 | 6/2008 | |
| WO | 2008089110 | 7/2008 | |
| WO | 2009129490 | 10/2009 | |
| WO | 2009140300 | 11/2009 | |
| WO | 2010092059 | 8/2010 | |
| WO | 2010138176 | 12/2010 | |
| WO | 2011154862 | 12/2011 | |
| WO | 2013112670 | 8/2013 | |
| WO | 2014028230 A1 | 2/2014 | |

OTHER PUBLICATIONS

"Retain." Dictionary.com. Dictionary.com, n.d. Web. Aug. 7, 2013.*
Golodnitsky et al., Advanced materials for the 3D microbattery, 2006, Journal of Power Sources, 153, 281-287.
Chamran et al., Three-dimensional nickel-zinc microbattereis, 2006, MEMS, Jan. 22-26, 2006, 950-953.
Patent Cooperation Treaty, International Search Report for PCT/US2008/050942, dated May 18, 2008.
Chan et al., High-performance lithium battery anodes using silicon nanowires, Nature Nanotechnology, 3, 31-35.
Serpo, A tenfold improvement in battery life?, ZDNet News, Jan. 15, 2008, 2 pages.
Long et al., Three-Dimensional battery Architectures, Chemical Reviews, 2004, 104, 4463-4492.
Liu, C., Foundations of MEMS, Chapter 10, 1-55.
Kanamura et al., Electrophoretic fabrication of LiCoO2 positive electrodes for rechargeable lithium battersi, Journal of Power Sources, 2001, 97-98, 294-297.
Caballero et al., LiNi.5Mn1.5O4 thick-film electrodes prepared by electrophoretic deposition for use in high voltage lithium-ion battters, Journal of Power Sources, 156, 2006, 583.

(56) References Cited

OTHER PUBLICATIONS

Wang et al., Li+-intercalation electrochemical/chromic props of vanadium pentoxide films by sol electrophoretic deposition, Electrochimica Acta, 51, 2006, 4865-4872.
Nichizawa et al., Template synth of polypyrrole-coated spinel LiMn2O4 nantubules and props as cathode active materials for Li batteries, J. Electrochemical Society, 1997, 1923-1927.
Shembel et al., Thin Layer Electrolytic Monbdenum Oxysulfides for Li Secondary batteries with liquid and polymer electrolytes, 5th Adv Batteries and Accumulators, 2004.
Kobrin et al., Molecular Vapor Deposition—An imporved Vapor-Phase deposition technique of molecular coatings for MEMS Devices, Semi Tech Symp: (STS,ISM), 2004.
Green, et al., Structured Silicon Anodes for Li battery applications, Electrochem & Solid State Letters, 6, 2003, A75-A79.
Shin et al., Porous silicon negative electrodes for rechargeable lithium batteries, Journal of Power Sources, 193, 2005, 314-320.
Broussely et al., Li-ion batteries and portable power source prospects for the next 5-10 years, Journal of Power Sources, 136, 2004, 386-394.
Lehmann, The physics of macropore formation in low doped n-type silicon, Journal of Electrochemical Society, 149 (10), 1993, 2836-2843.
Vyatkin et al., Random and ordered macropore formation in p-type silicon, Journal of Electrochemical Society, 149 (1) G70-G76.
Van Den Meerakker et al., Etching of deep macropores in 6 in. Si wafers, Journal of Electrochemical Society, 147 (7), 2000, 2757-2761.
Balakrishnan et al., Safety mechanisms in lithium-ion batteries, Journal of Power Sources, 155, 2006, 401-414.
Arora et al., Battery separators, Chemical Reviews, 104, 2004, 4419-4462.
Scrosati et al., Lithium batteries: Status, prospects and future, Journal of Power Sources, 2010, 195: 2419-2430 Nov. 11, 2009.
Mu et al., Silicon nanotube array/gold electrode for direct electrochemistry of cytochrome C, J. Phys. Chem. B, 2007, 111(6), 1491-1495.
European Patent Office, Extended Search Report for EP 13740825.8, dated Aug. 8, 2015, 9 pages Aug. 8, 2015.
Obrovac, M. N. et al., Reversible Cycling of Crystalline Silicon Powder, Journal of The Electrochemical Society, 2007, A103-A108, 154(2) Dec. 21, 2006.
Waidmann, S. et al., Tuning nickel silicide properties using a lamp based RTA, a heat conduction based RTA or a furnace anneal, Microelectronic Engineering 83, 2006, 2282-2286 Oct. 19, 2006.
Bourderau et al., "Amorphous Silicon as a Possible Anode Material for Li-Ion Batteries," Journal of Power Sources, 1999, 81-82, 233-236 Sep. 30, 1999.
Li et al., "The Crystal Structural Evolution of Nano-Si Anode Caused by Lithium Insertion and Extraction at Room Temperature," Solid State Ionics, 2000, 135, 181-191 Nov. 30, 2000.
Kasavajjula et al., Nano- and Bulk-Silicon-Based Insertion Anodes for Lithium-Ion Secondary Cells, Journal of Power Sources, 2007, 1003-1039, 163 Nov. 9, 2006.
Patent Cooperation Treaty, International Search Report issued for PCT/US2014/025200, dated Jul. 29, 2014, 4 pages Jul. 29, 2014.
Whitehead et al., Current Collectors for positive electrodes of lithium-based batteries, Journal of the Electrochemical Society, 2005, A5105-A2113, 152(11) Sep. 8, 2005.
European Patent Office, Extended European Search Report for 14768734.7, EP 2973785, 10 pages dated Jul. 15, 2016.
Zhang et al., High aspect ration nickel structions fabricated by electrochemical replication of hydrofluoric acid etched silicon, Electrochemical and Solid-State Letters, 2006, 9(9): C150-C152.
European Patent Office, Extended European Search Report for 12866772.2, EP 2807698, dated Oct. 8, 2015, 3 pages.
Patent Cooperation Treaty, International Search Report issued on PCT/US2012/022393, dated Oct. 10, 2012, 4 pages.
Harraz et al., Immersion plating of nickel onto a porous silicon layer from fluoride solutions, Phys. Stat. Sol., 2003, 197(1): 51-56.
Harraz et al., Different behavior in immersion plating of nickel on porous silicon from acidic and and alkaline fluoride media, J. Elect. Soc., 2003, 150(5): C277-284.
Xu et al., Theorectical studies of displacement disposition of nickel into porous silicon with ultrahigh aspect ration, Electrochimica Acta, 2006, 52, 3901-3909.
Xu et al., Nickel displacement deposition of porous silicon with ultrahigh aspect ratio, J. Elect. Soc., 2007, 154(3): 170-174.
Masuda, H. et al., Ordered Metal Nanohole Arrays Made by a Two-Step Replication of Honeycomb Structures of Anodic Alumina, Science, 1995, 268(5216), 1466-1468 Jun. 9, 1995.
Nishizawa, M. et al., Template synthesis of polypyrrole-coated spinel LiMn2O2 nanotubules and their properties as cathode active materials for lithium batteries, J. Electrochemical Society, 1997, 144(6), 1923-1927.
Fu, Y. et al., Investigation of Aspect Ratio of Hole Drilling from Micro to Nanoscale via Focused Ion Beam Fine Milling, Proceedings of SMA Symposium, 2005, 1-5 Jan. 15, 2005.
Oukassi, S. et al., Microfabricated Solid State Thin Film Lithium Batteries, Mater. Res. Soc. Symp. Proc. vol. 973 © 2007 Materials Research Society , 0973-BB01-02, 7 pgs. Jan. 1, 2007.
European Patent Office, Extended European Search Report for 13829954.0, EP 2885830, dated Feb. 19, 2016, 7 pages.
Iaboni et al., Li15Sl4 Formation in silicon thin film negative electrodes, Journal of the Electrochemical Society, 2016, 163(2), A255-A261.
Maranchi et al., High capacity, reversible silicon thin-film anodes for lithium-ion batteries, Electronchemical and Solid-State Letters, 2001, 6(9), A198-A201.
Su et al., Silicon-Based Nanomaterials for Lithium-Ion Batteries: A Review, Advanced Energy Materials, 2013, 1-23.
Patent Cooperation Treaty, International Search Report for PCT/US2013/053235, dated Jan. 28, 2014, 5 pages Jan. 28, 2014.

\* cited by examiner

Module Properties

| Parameter | Value |
|---|---|
| Energy, kWh | 4.17 |
| Capacity, Ah | 133 |
| Voltage, V | 31.35 |
| Wt, kg | 12.05 |
| Vol., liters | 4.19 |
| kWh/kg | 0.346 |
| kWh/liter | 0.995 |

Fig. 10

Pack Properties

| Parameter | Value | USABC Requirement | USABC Long-term Goal |
|---|---|---|---|
| Energy, kWh | 50.0 | | |
| Capacity, Ah | 133 | | |
| Voltage, V | 376.2 | | |
| Wt, kg | 164.9 | | |
| Vol., liters | 66.7 | | |
| kWh/kg | 0.303 | 0.15 | 0.2 |
| kWh/liter | 0.750 | 0.23 | 0.3 |

Fig. 11

BATTERY CELL HAVING PACKAGE ANODE PLATE IN CONTACT WITH A PLURALITY OF DIES

CROSS-REFERENCE TO RELATED APPLICATIONS

This application is a continuation of U.S. patent application Ser. No. 12/882,087, entitled "Battery Cell Having Package Anode Plate in Contact with a Plurality of Dies," filed Sep. 14, 2010, which claims priority under 35 U.S.C. §120 to U.S. application Ser. No. 12/013,388, entitled "Three-Dimensional Batteries and Methods of Manufacturing the Same," filed on Jan. 11, 2008, which claims priority under 35 U.S.C. §119(e) to: (i) U.S. Provisional Application No. 60/884,836, entitled "Electrodes For Three Dimensional Lithium Batteries And Methods Of Manufacturing Thereof," filed on Jan. 12, 2007; (ii) U.S. Provisional Application No. 60/884,828, entitled "Three-Dimensional Batteries and Methods of Manufacturing Using Backbone Structure," filed on Jan. 12, 2007; and (iii) U.S. Provisional Application No. 60/884,846, entitled "Three-Dimensional Lithium Battery Separator Architectures," filed on Jan. 12, 2007. Each of the foregoing applications is hereby incorporated by reference herein in its entirety.

BACKGROUND OF THE INVENTION

1. Technical Field of the Invention

Implementations consistent with the principles of the invention generally relate to the field of battery technology, more specifically to three-dimensional energy storage systems and devices, such as batteries and capacitors, and methods of manufacturing thereof.

2. Background

Existing energy storage devices, such as batteries, typically lack good thermal conductivity to facilitate removal of heat generated within the cell from the cell. In traditional battery packs as much as 50% of the pack volume and weight is dedicated to thermally conducting structures to remove heat from the cells.

Figure 1:
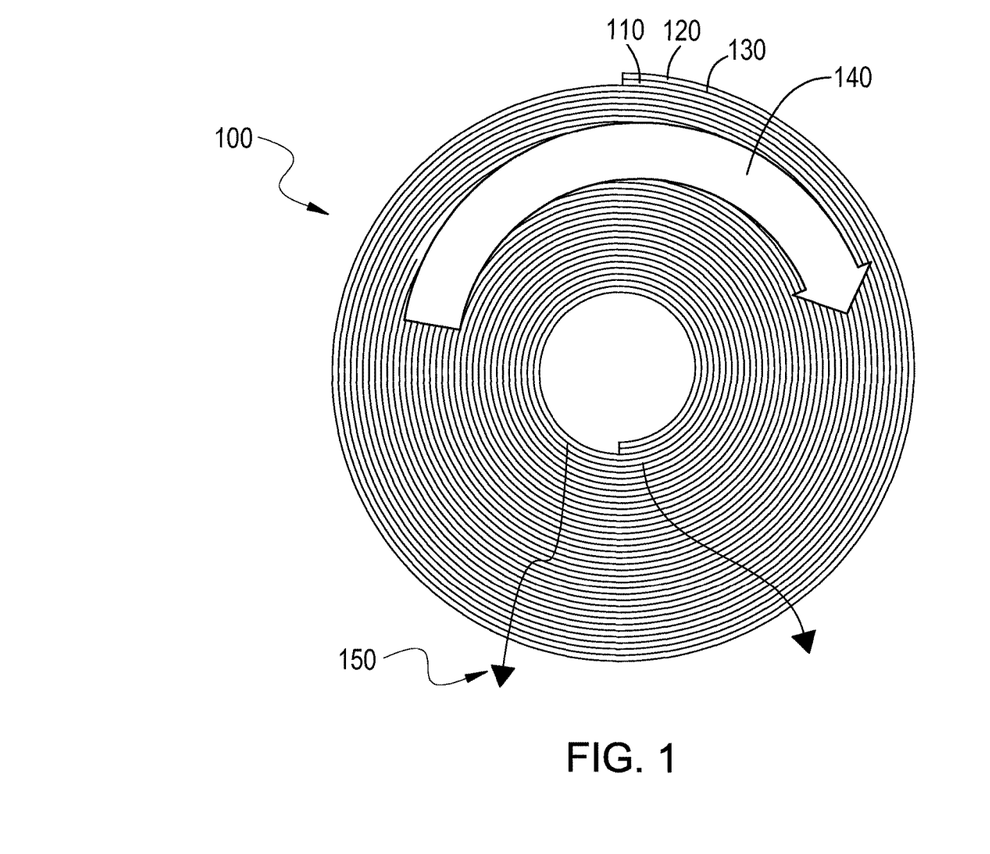
FIG. 1 is a generic cross-section of an existing jelly roll battery cell.

For example, in a conventional jelly roll type energy storage device there is no direct, high conductivity path for heat to escape from the center of the cell. FIG. 1 shows a cross-section of a conventional jelly roll 100, constructed by rolling several alternating layers of anode electrode material 110 and cathode electrode material 120 into a cylindrical shape with separators 130 between each successive cathode layer and anode layer. A typical example of a jelly roll is consumer Nickel Cadmium batteries, sold in standard sizes AAA-D. As shown in FIG. 1, the jelly roll cell has good circumferential thermal conductivity 140 within each electrode layer, but this does not help remove heat from the cell. The heat generated near the center of the cell has to move radially 150 across each electrode and separator to reach the outside of the cell. The thermal conductivity of each electrode is very poor (approximately 1-3 W/m-K) compared to silicon, and the thermal conductivity of separator material is even worse (approximately 0.3 W/m-K). The jelly roll cell thus has poor radial thermal conductivity.

Another common design is the prismatic cell, commonly used for mobile phone batteries, which employs a thinner, typically substantially rectangular prism shaped, design. A conventional prismatic cell is constructed of alternating layers of anode electrical material and cathode electrical material wrapped into a substantially rectangular prism shape with separators between each successive cathode layer and anode layer. The typical prismatic cell has fewer electrode pairs when compared to a comparable capacity jelly roll cell. However, there is still no direct, high conductivity path for heat to escape from the center of the prismatic cell. As with the jelly roll cell, any heat generated in the inner electrode layers of the prismatic cell has to travel through multiple layers of electrodes and separators to escape the cell.

The following reference may further help to illustrate the state of the art, and is therefore incorporated by reference as non-essential subject matter herein: Long et. al., "Three-Dimensional Battery Architectures," *Chemical Reviews*, (2004), 104, 4463-4492 ("Long"). Long discloses various 3-dimensional battery cell architectures, but does not describe how to incorporate such cell architectures into useful modules or battery packs as disclosed and claimed in the present application. Long does not teach or suggest how to solve the problem of thermal conductance while containing the electrolyte, as solved by the present invention.

It would be desirable to incorporate battery cells into compact battery modules and battery packs without requiring additional structure to remove heat generated within the cells.

It would be desirable to make battery packs with increased pack energy density for a given cell energy density, while addressing the above issues or other limitations in the art.

It would be desirable to make battery packs with improved thermal performance with reduced weight and volume, while addressing the above issues or other limitations in the art.

SUMMARY OF THE INVENTION

Various methods and apparatus relating to battery packs and methods of manufacturing them are disclosed and claimed.

In certain embodiments, a battery cell comprises a plurality of dies, each die including a die anode current collector and a die cathode current collector, wherein a plurality of anode fingers adjoins and extends from the die anode current collector and a plurality of cathode fingers adjoins and extends from the die cathode current collector; an electrolyte; a battery cell package anode plate in contact with the die anode current collector of each of the plurality of dies, wherein the battery cell package anode plate is electrically and thermally conductive and forms part of an enclosure that retains the electrolyte; and a battery cell package cathode plate in contact with the die cathode current collector of each of the plurality of dies, wherein the battery cell package cathode plate is electrically and thermally conductive and forms part of the enclosure that retains the electrolyte.

In certain embodiments, a battery module comprises a first battery cell and a second battery cell. The first battery cell includes a first plurality of dies, each of the first plurality of dies including a die anode current collector and a die cathode current collector, wherein a plurality of anode fingers adjoins and extends from the die anode current collector, and wherein a plurality of cathode fingers adjoins and extends from the die cathode current collector; a first electrolyte; a first battery cell package anode plate having a first side in contact with the die anode current collector of each of the first plurality of dies, wherein the first battery cell package anode plate is electrically and thermally conductive and forms part of a first enclosure that retains the first electrolyte; and a first battery cell package cathode plate in contact with the die cathode current collector of each of the first plurality of dies, wherein the first battery cell package cathode plate is electrically and thermally conductive and forms part of the first enclosure that retains the first electrolyte. The second battery cell, includes a second plurality of dies, each of the second plurality of dies including a die anode current collector and a die cathode current collector; and a second electrolyte; wherein a second side of the first battery cell package anode plate is in contact with the die cathode current collector of each of the second plurality of dies, and wherein the first battery cell package anode plate forms part of a second enclosure that retains the second electrolyte.

In certain embodiments, a battery module comprises a first battery cell and a second battery cell. The first battery cell includes a first die including a first die anode current collector and a first die cathode current collector, wherein a plurality of anode fingers adjoins and extends from the first die anode current collector, and wherein a plurality of cathode fingers adjoins and extends from the first die cathode current collector; a first electrolyte; a first battery cell package anode plate having a first side in contact with the first die anode current collector, wherein the first battery cell package anode plate is electrically and thermally conductive and forms part of a first enclosure that retains the first electrolyte; and a first battery cell package cathode plate in contact with the first die cathode current collector, wherein the first battery cell package cathode plate is electrically and thermally conductive and forms part of the first enclosure that retains the first electrolyte. The second battery cell includes a second die including a second die anode current collector and a second die cathode current collector; and a second electrolyte; wherein a second side of the first battery cell package anode plate is in contact with the second die cathode current collector, and wherein the first battery cell package anode plate forms part of a second enclosure that retains the second electrolyte.

Other aspects and advantages of the present invention may be seen upon review of the figures, the detailed description, and the claims that follow.

BRIEF DESCRIPTION OF THE DRAWINGS

Some embodiments of the invention are described with reference to the following figures.

DETAILED DESCRIPTION

Certain embodiments of the invention relate to the design of three-dimensional battery cells and their incorporation into battery modules and battery packs. The present invention may be particularly advantageous when incorporated into large battery packs, for example, those used in electric vehicles.

The unique architecture of the battery cells of certain embodiments of the invention provides improved thermal performance with significant impact on cycle and calendar life when incorporated into a battery pack. Substantially higher pack energy density for a given cell energy density is provided when compared to a conventional cell.

For high-voltage and/or high capacity applications, such as electric vehicles, a large number of battery cells may be joined in series and parallel to obtain the high voltage and capacity required. For example, if it is desired to assembly a battery pack with a voltage of 340 V and a capacity of 120 Ahr, a typical battery back might be assembled by connecting 13 dies in parallel to form a 3.4 V, 20 Ahr cell, connecting 6 such cells in parallel to form a 3.4V, 120 Ahr battery module, and then connecting 100 such battery modules in series to form a 340 V, 120 Ahr battery pack.

In certain embodiments, a very high capacity cell is used to reduce the number of cells and/or modules required to generate the desired voltage and capacity. For example, a very high capacity cell can include 78 dies connected in parallel to generate 3.4 V and 120 Ahr. Using such high capacity cells, a 34 V, 120 Ahr battery module can be created by connecting 10 such cells in series. 10 such modules can be connected in series to create a 340 V, 120 Ahr battery pack.

In certain other embodiments, a very high capacity cell can be used to eliminate the use of battery modules as an intermediate step in assembling a battery pack. For example, 78 dies can be connected in parallel to form a 3.4V, 120 Ahr cell. 100 such cells can then be connected in series to form a 340V, 120 Ahr battery pack.

Figure 2:
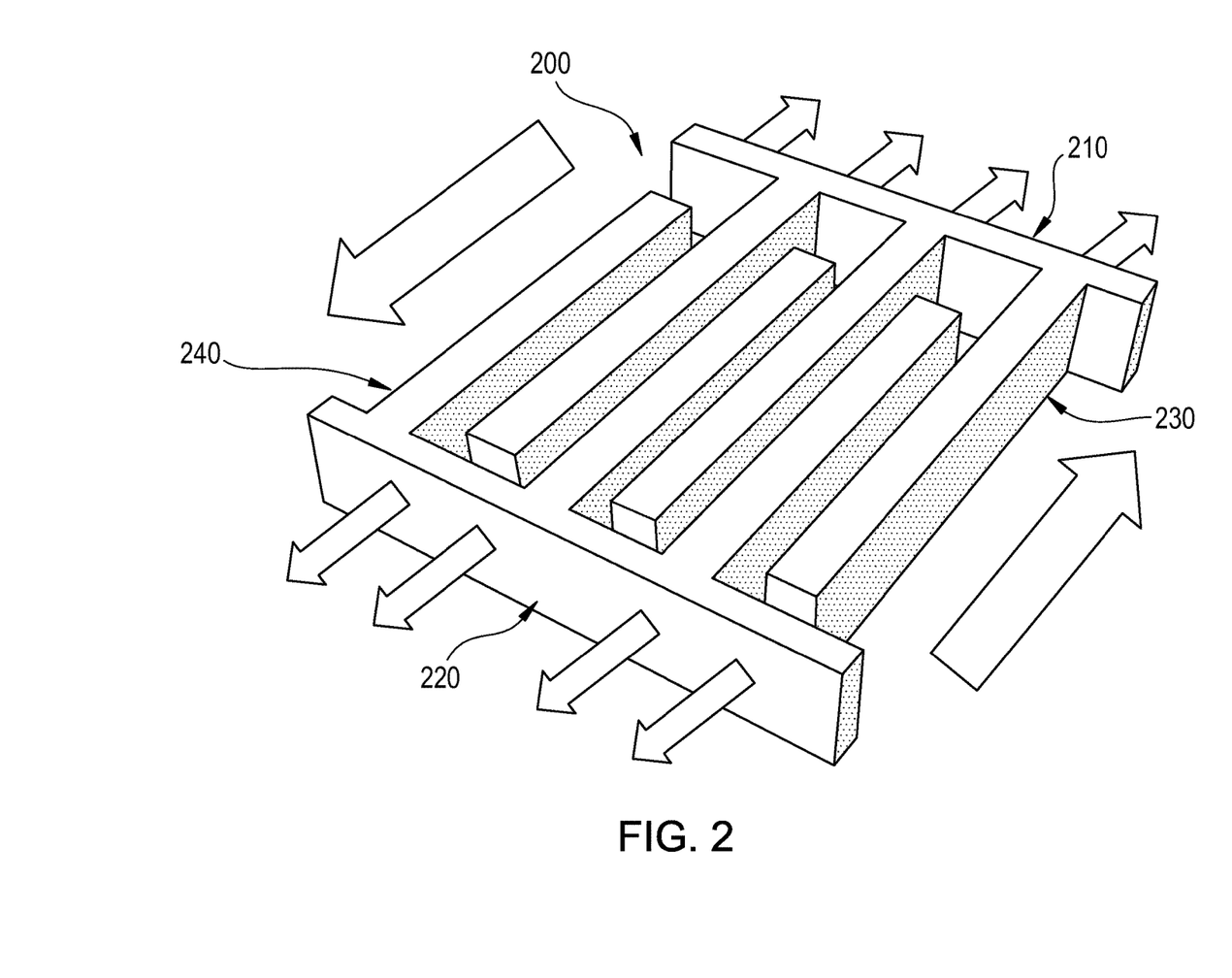
FIG. 2 is a schematic illustration of a possible shape into which a backbone structure may be assembled according to certain embodiments of the invention.

In certain embodiments, as shown in FIG. 2, each die 200 includes a die anode current collector 210 and a die cathode current collector. A plurality of anode fingers 230 adjoin and extend from the die anode current collector 210 and between corresponding cathode fingers 240 that adjoin and extend from the die cathode current collector 220. This architecture provides a direct, high thermal conductivity path for each electrode pair to dissipate heat to the outside of the cell. As illustrated by the arrows, heat generated at each electrode surface is transmitted to the respective die anode current collector 210 or die cathode current collector 220. In certain embodiments, the heat generated at each electrode surface may be transmitted to the backbone of the electrode and directly conducted out to the associated current collector. Copending U.S. application Ser. No. 12/013,388, entitled "Three-Dimensional Batteries and Methods of Manufacturing the Same," filed on Jan. 11, 2008, which is incorporated herein by reference in its entirety, provides a description of exemplary embodiments of electrode backbone structures. In some embodiments, the electrode backbone may comprise silicon. The thermal conductivity of silicon is similar to aluminum (148 W/m-K vs. 250 W/m-K respectively).

In certain embodiments, the thermal performance of the cell may be improved by creating a solid unitary structure where the die anode current collector and die cathode current collector are heat sunk by direct attachment to the cell packaging. The anode may comprise, nickel, copper, or conductive carbon, and the cathode may comprise platinum, aluminum, titanium, or conductive carbon. One of skill in the art will recognize that the foregoing materials may be substituted for the respective parts functioning as anodes or cathodes in any of the embodiments disclosed herein or covered by the claims of the instant invention. As a result, a battery cell assembled according to certain embodiments of the invention will have improved thermal performance compared to a conventional cell. Although multiple dies may be used to create a higher capacity cell, one of skill in the art will understand that a cell consisting of a single die may be used for certain applications without departing from the scope of the invention.

Figure 3:
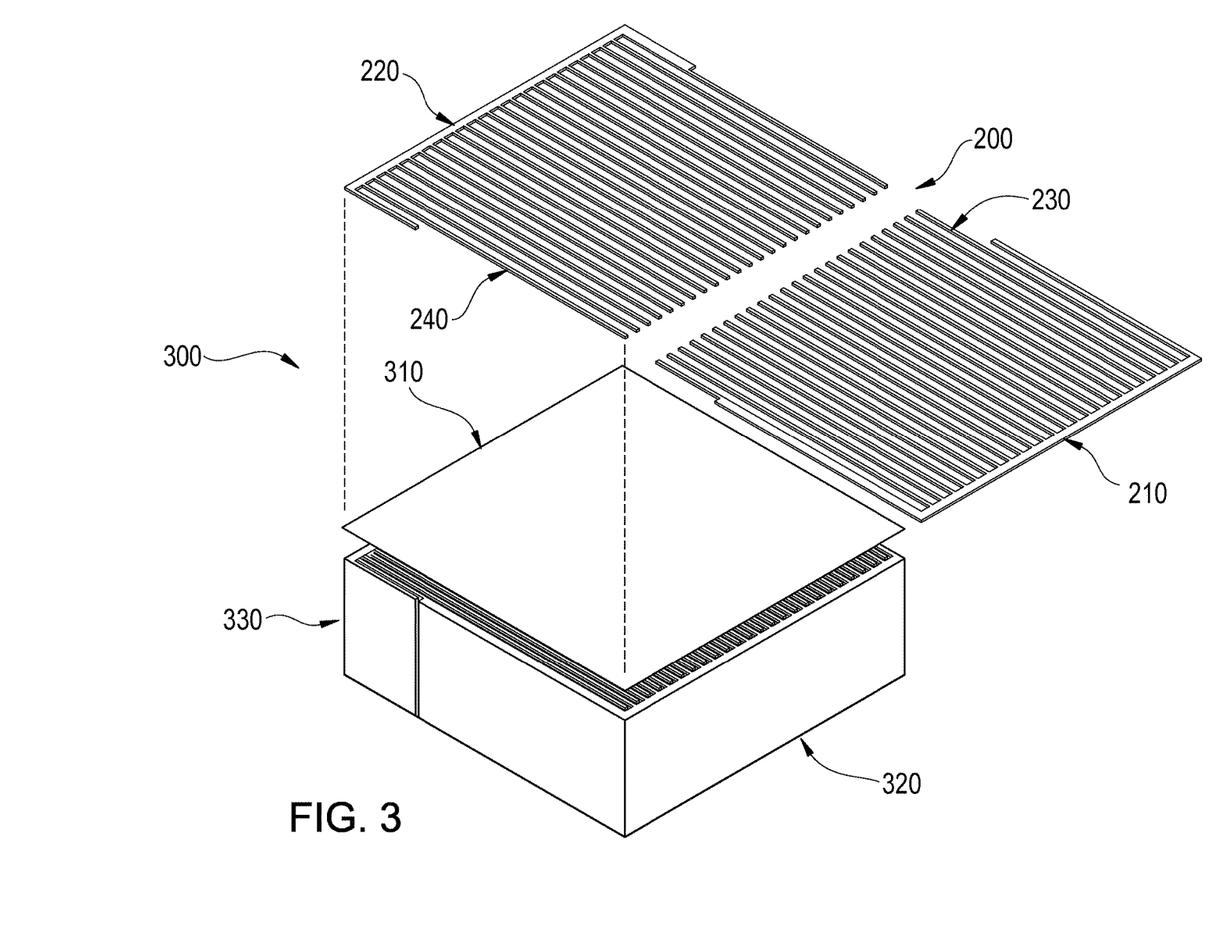
FIG. 3 is an exploded view of a die stack according to certain embodiments of the invention.

FIG. 3 shows an exploded view of a die stack used to form a high capacity battery cell in certain embodiments of the invention. In certain embodiments, a plurality of dies 200 may be stacked such that the die anode current collectors 210 are connected to a battery cell package anode plate 320 and the die cathode current collectors 220 are connected to a battery cell package cathode plate 330. A separator 310 is placed between adjacent dies to electrically isolate the anode fingers 230 and cathode fingers 240 of each die from the fingers of any adjacent die. The battery cell package anode plate and the battery cell package cathode plate may be electrically and thermally conductive and may form part of an enclosure that retains an electrolyte.

In certain embodiments, the battery cell package anode plate 320 comprises a metal sheet having a plurality of dimple protrusions. The battery cell package anode plate 320 may comprise nickel or conductive carbon. In certain embodiments, the battery cell package cathode plate 330 comprises an aluminum sheet having a plurality of dimple protrusions.

In certain embodiments, the enclosure that retains the electrolyte may be shaped generally as a rectangular block having six outer faces. In certain embodiments, a first outer face may include an outer surface of battery cell package anode plate 320 and a second outer face opposite the first outer face may include an outer surface of battery cell package cathode plate 330. In certain other embodiments, at least three of the six outer faces may include an outer surface of the battery cell package anode plate 320. In certain embodiments, five of the six outer faces include an outer surface of the battery cell package anode plate 320. In certain embodiments, at least three of the six outer faces may include an outer surface of the battery cell package cathode plate 330. In certain embodiments, at least five of the six outer faces may include an outer surface of the battery cell package cathode plate 330.

In certain embodiments, the structure of inter-digitated anode fingers and cathode fingers provides an excellent thermal path to the exterior of the cell. As described above, the anode and cathode structure can be wrapped around the sides of the battery cell to enhance thermal conduction to the sides of a battery module. In conjunction with optimizing these structures for electrical performance, they can be optimized for thermal performance by varying geometry as well as the relative side coverage of the anode and cathode structures (which have differing thermal conductivities).

Below is an example of how this improved thermal performance can result in a significantly simpler and cheaper module design. In traditional packs, as much as 50% of the pack volume and weight is dedicated to thermally conducting structures to remove heat from the cells. In certain embodiments of the invention, as shown for example in FIG. 4, no additional heat conducting structures are needed.

Figure 4:
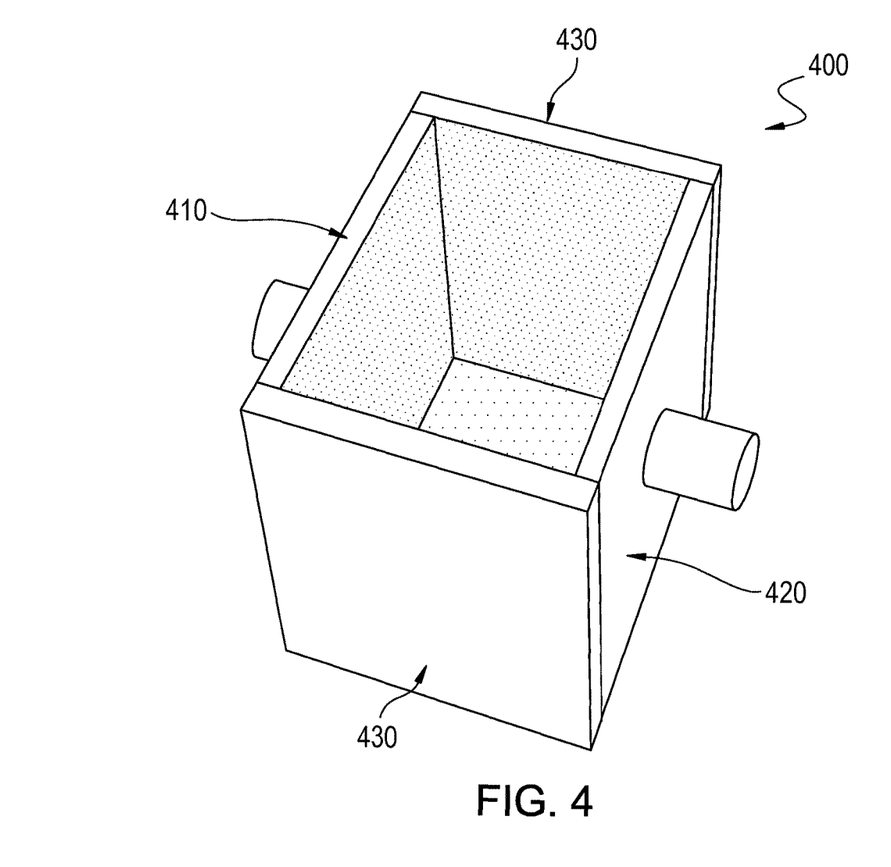
FIG. 4 is a schematic representation of a battery cell, according to an embodiment of the invention.

In certain embodiments, the battery cell 400 may be constructed by building electrically and thermally conducting sides which are in intimate contact with corresponding sides of a die stack 300. For example, in certain embodiments, battery cell package anode plate 410 forms part of the enclosure that retains the electrolyte and is in good electrical and thermal connection with the die anode current collector 210 of each of the plurality of dies. The battery cell package anode plate 410 may comprise copper, nickel, or conductive carbon. In certain embodiments, battery cell package cathode plate 420 forms part of the enclosure that retains the electrolyte and is in good electrical and thermal connection with the die cathode current collector 220 of each of the plurality of dies. The battery cell package cathode plate 420 may comprise aluminum or conductive carbon. The other sides 430 of the battery cell package may comprise a thermally conductive, but electrically insulative material such as plastic. Exemplary plastic materials that may be utilized in certain embodiments of the invention include without limitation polyethylene, polypropylene, and polystyrene.

In conventional designs, the battery electrodes may not have any direct contact with the sides of the battery cell package. Heat may therefore have to transfer through air or a vacuum in order to reach the sides of the battery cell package. Thus any material used for the sides have the battery cell package, which is in contact with the battery electrodes, either directly or via some other thermally conductive material and which has higher thermal conductivity than air or a vacuum, will result in improved thermal performance compared to conventional designs. A material may be considered thermally conductive if it possesses a thermal conductivity of greater than about 0.1 W/mK. A material may be considered electrically insulative if it possess an electrical resistivity of greater than about $10^{12}$ ohm-cm. Exemplary thermally conductive, electrically insulative plastics are produced by Cool Polymers, Inc. of Warwick, R.I. under the brand name CoolPoly® D-series Thermally Conductive Dielectric Plastics, which advertise thermal conductivity of 1.0-10 W/mK and electrical resistivity typically in the range of $10^{12}$ to $10^{16}$ ohm-cm. The appropriate material may be selected to ensure material compatibility with electrolyte fluids such as ethylene carbonate, polypropylene carbonate, and dimethyl ethyl carbonate.

Since the heat conduction from the electrodes to the die anode current collectors 210 and die cathode current collectors 220 is so good, placing the die anode current collectors 210 and die cathode current collectors 220 in excellent thermal contact with the outside of the cell (also the cell current collectors) results in the heat being effectively conducted away from the interior of the dies to the exterior of the cell without any additional structures. These cells can then be strung together to form modules and packs with whatever series/parallel arrangement required for a particular application. Cooling, if needed, can be incorporated at the module level rather than the individual die level which would be the case with conventional architectures, dramatically reducing the cost of this system.

The combination of superior thermal performance and a rigid, unitary structure allows the cell of certain embodiments of the invention to be integrated in larger modules and packs with unique architectures.

Figure 5:
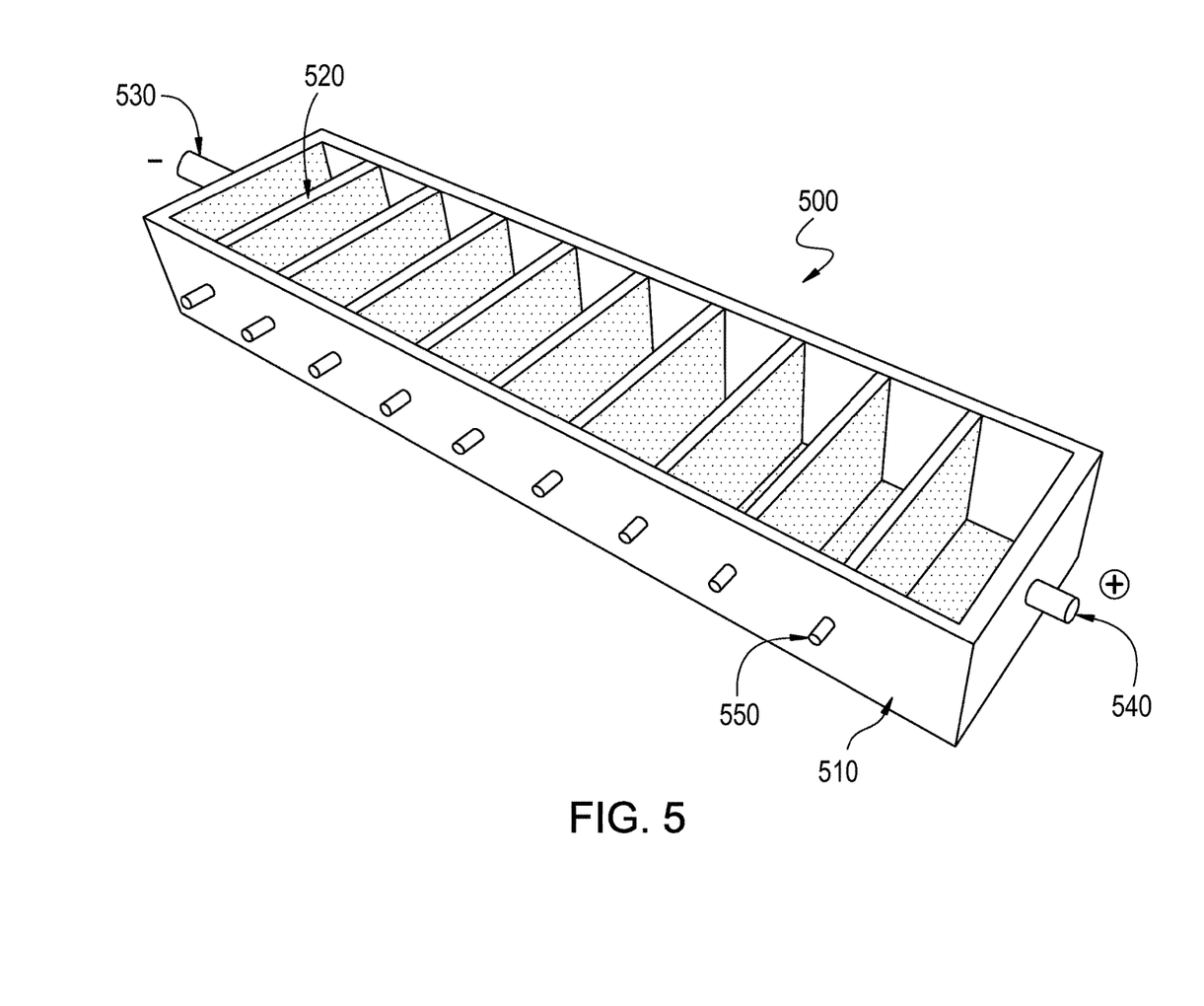
FIG. 5 is a schematic representation of a battery module, according to an embodiment of the invention.

Details of module design of certain embodiments are described below. The solid, unitary design allows a unique approach to cell packaging where the cell enclosure can be eliminated and the cell stack directly incorporated in the module housing as shown in FIG. 5. In certain embodiments, battery module 500 includes battery module casing 510, which may be constructed of a thermally conductive but electrically insulative material, such as plastic. Electrolyte is introduced and a top cover is sealed to battery module casing 510. Each sub-compartment contains a cell with electrolyte. The electrolyte is isolated in each cell. As a result, this module represents a very efficient way of packaging a number of cells in series.

The interior of the battery module casing can be separated into individual battery cells by battery cell package plates 520. In certain embodiments, a first battery cell package plate 520 has a first side that serves as a first battery cell package anode plate for a first battery cell and forms part of a first enclosure which retains a first electrolyte in a first battery cell, and a second side, which serves as a second battery cell package cathode plate for a second battery cell and forms part of a second enclosure which retains a second electrolyte in a second battery cell. In such embodiments, the first side is in contact with the die anode current collector of each of a first plurality of dies and the second side is in contact with the die cathode current collector of each of a second plurality of dies. The battery cell package plates may be electrically and thermally conductive, which, in combination with the thermally conductive battery module casing 510, eliminates the need for additional heat removal structure and simplifies the battery module design.

The battery cell package plates 520 may comprise electrically conductive carbon. The carbon material may be optimized for thermal and structural performance by using layered or composite structure with anisotropic properties.

Alternately, the battery cell package plates 520 may comprise a first metal laminate in contact with the die anode current collector of each of a first plurality of dies, and a second metal laminate in contact with the die cathode current collector of each of a second plurality of dies. The first metal laminate may comprise nickel and the second metal laminate may comprise aluminum.

Each battery cell package plate 520 may includes a conductive extension 550 that protrudes from the periphery of battery cell package plate 520 through a hole in module housing 510. Conductive extension 550 may be accessible from the exterior of the battery module to facilitate monitoring and balancing of the respective cells.

The battery cell package plates 520 may be sealed to the battery module casing 510 to retain the electrolyte in the individual battery cells. For example, the battery cell package plates may define a plate periphery and include an elastomeric seal around the plate periphery in order to form a portion of the enclosure that retains a first electrolyte in a first cell and a second electrolyte in a second cell. Alternately each battery cell package plate 510 may be sealed to the battery module casing 510 by melting the plastic of the casing to the carbon of the plate, insert molding, adhesive or caulk, mechanical clamps, or other methods known to those of ordinary skill in the art.

The clearance space between the sides of the die and the module walls may be filled to enhance thermal conductivity to the module side walls. Fillers may include conductive adhesives, conductive pastes, metal spring contacts, conductive elastomers, and other materials known to those of ordinary skill in the art.

The battery module may be fitted with an anode connector 530 which is electrically connected with the battery cell package anode plate of a battery cell on one end of the battery module and a cathode connector 540 connected to the battery cell package cathode plate of the battery cell on the opposite end of the battery module. The anode connector 530 and cathode connector 540 may be used to connect a plurality of battery modules in a variety of series and parallel arrangements to form a battery pack with desired voltage and capacity characteristics.

Figure 6A:
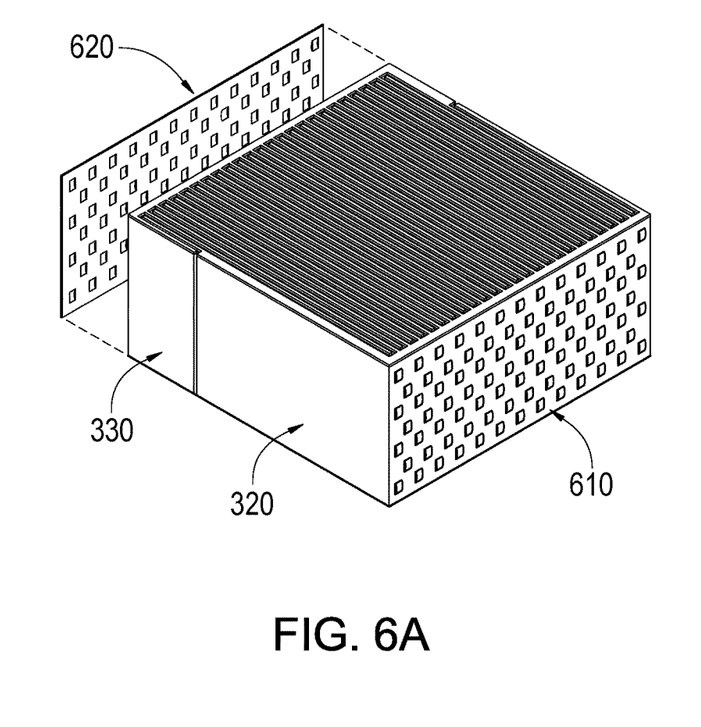
FIGS. 6A-B are schematic representations of a die stack equipped with spring plates, according to an embodiment of the invention.
Figure 6B:
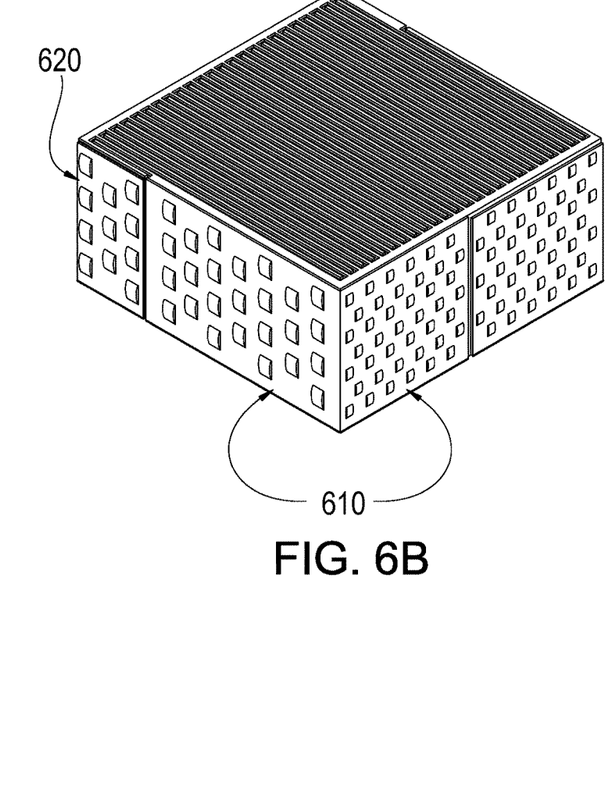

In certain embodiments with a rigid module housing with fixed location interconnects, a spring-like element may be used to ensure electrical contact accounting for nominal clearances, thermal expansion, and mechanical vibrations. FIG. 6A displays an embodiment wherein spring plate 610 may be attached to the battery cell package anode plate 320 and spring plate 620 may be attached to battery cell package cathode plate 330 to ensure positive electrical contact with battery cell package plates 520. Spring plates 610 and 620 may be attached with conductive adhesive or other methods known to those of ordinary skill in the art. As shown in FIG. 6B, Spring plates 610 and 620 may wrap around the side of die stack 300 to provide improved thermal contact with sides 430 of battery cell 400 or the side walls of battery module casing 510. Spring plates 610 and 620 may comprise a metal sheet having a plurality of dimple protrusions, which may be optimized for electrical and thermal conductivity. Spring plate 610 may comprise copper and spring plate 620 may comprise aluminum.

Figure 7:
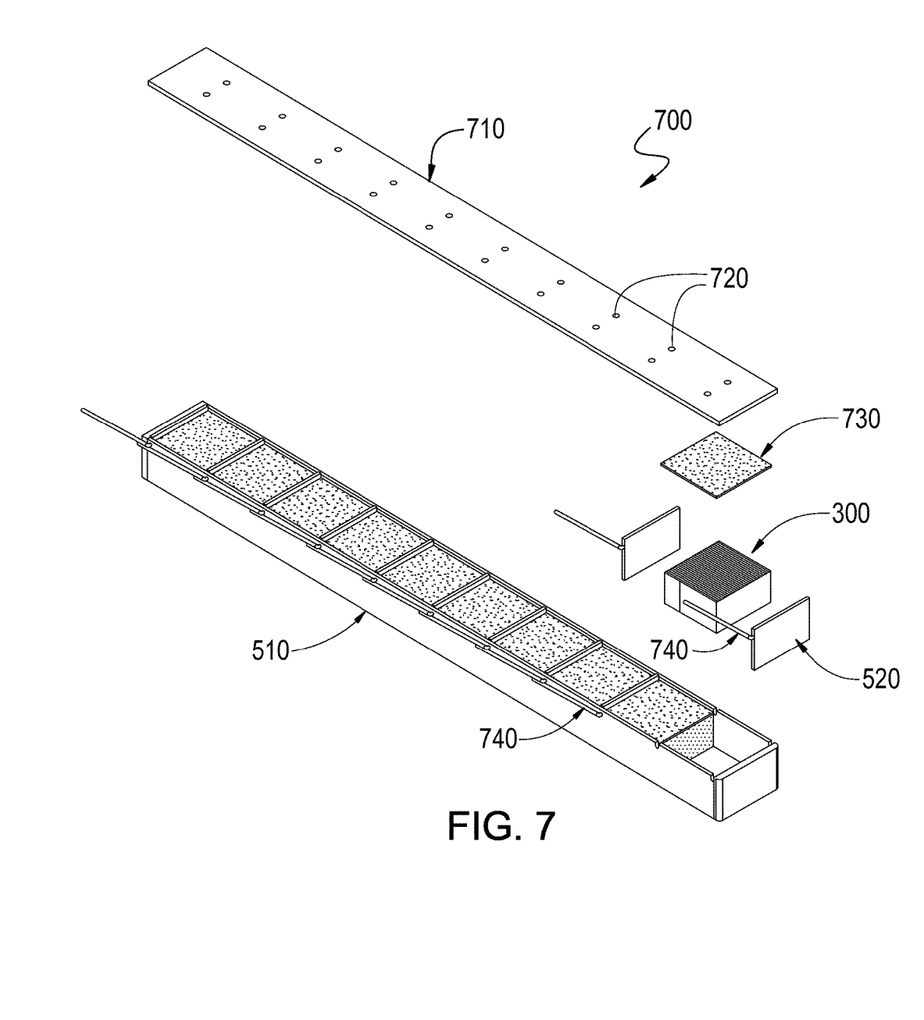
FIG. 7 is an exploded view of a battery module, according to an embodiment of the invention.
Figure 8:
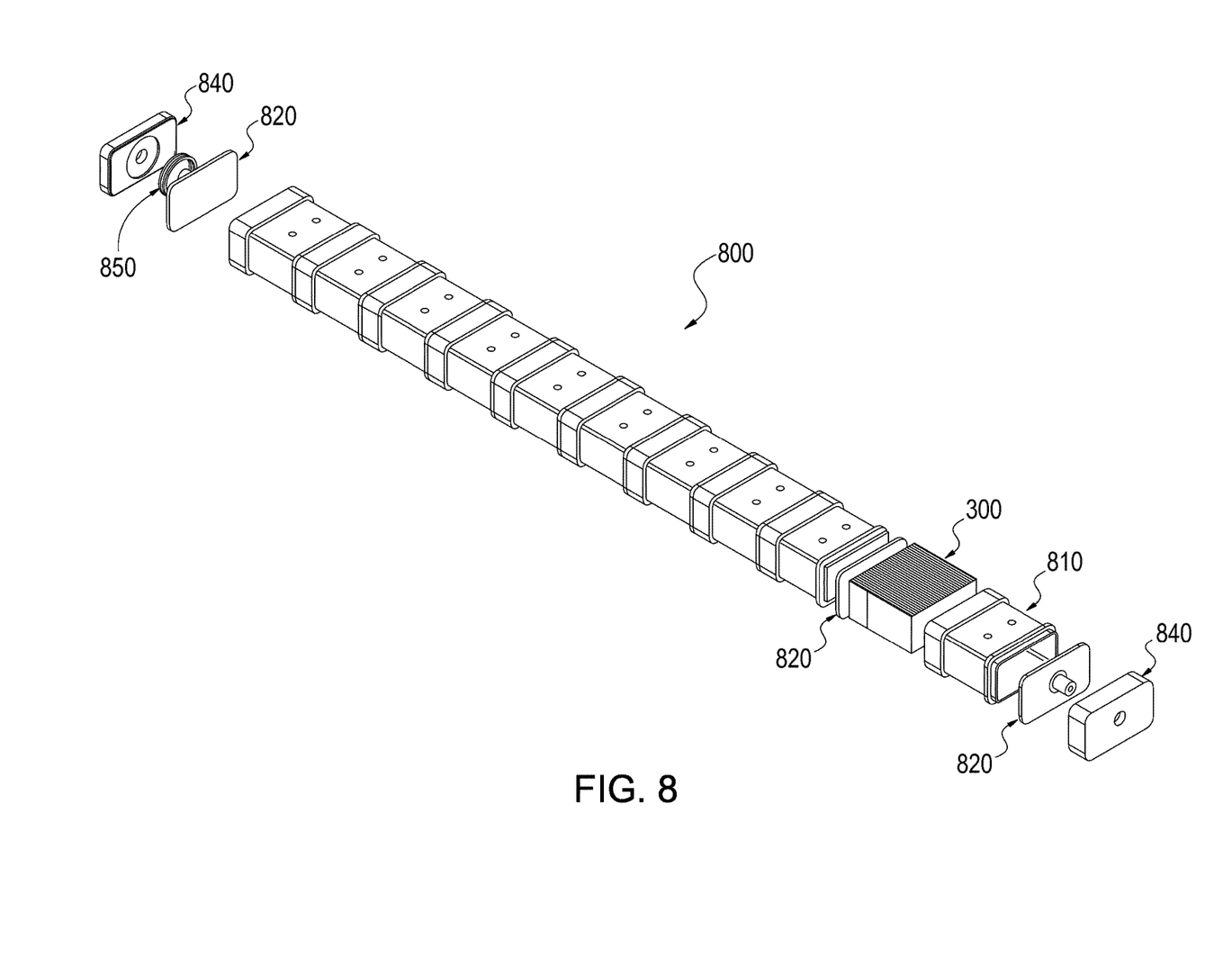
FIG. 8 is a perspective view of a battery module, according to an embodiment of the invention.

FIG. 7 displays an exploded view of a battery module 700 of certain embodiments of the invention. The interior of battery module casing 510 is divided into individual battery cells by battery cell package plates 520, to which are attached charging connections 740. A die stack 300 is inserted between each pair of battery cell package plates 520 to form individual battery cells. A cover 710 may be attached by welding or bonding plastic cover 710 to battery module casing 510. Alternately, cover 710 can be attached to battery module 510 using elastomeric seals or other methods known to those of ordinary skill in the art. Electrolyte holes 720 may be provided in cover 710 to permit addition of electrolyte to individual cells. The electrolyte holes 720 may be sealed after filling the cells to prevent spilling of electrolyte during battery operations. A compressible spacer 730 may be placed above and/or below each die stack 300 to hold the die stack 300 in place.

In certain embodiments, an axially flexible battery module housing can be used to retain the individual battery cells. As shown in FIGS. 8 and 9A-C, a battery module 800 can be constructed by connecting a plurality of battery cell enclosures 810 in series. A plurality of die stacks 300 are enclosed in individual battery cell enclosure 810 and separated by floating interconnects 820, which are electrically and thermally conductive. The floating interconnects 820 may define a periphery and include an elastomeric seal 830 around the periphery of the interconnect, which permits the interconnect to translate in an axial direction while maintaining a separation of the electrolyte between adjacent battery cells. The floating interconnects 820 may comprise conductive carbon. Alternatively, the floating interconnects 820 may be bimetallic, comprising a first metal laminate in contact with the die anode current collector of each of a first plurality of dies, and a second metal laminate in contact with the die cathode current collector of each of a second plurality of dies. The first metal laminate may comprise nickel and the second metal laminate may comprise aluminum.

Figure 9A:
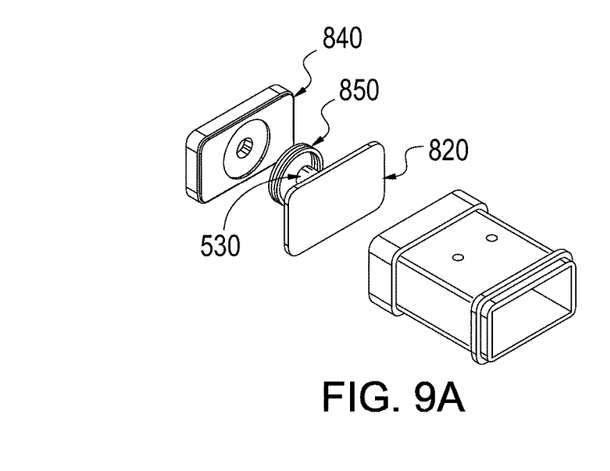
FIGS. 9A-C are exploded views of certain portions of the battery module of FIGS. 8A-B, according to certain embodiments of the invention.

FIG. 9A, shows a close up view of how, at each end of the battery module, an end cap 840 is provided to enclose the end battery cells. The battery cell enclosures 810 and the end caps 840 may comprise a thermally conductive but electrically insulative material, such as plastic.

Figure 9B:
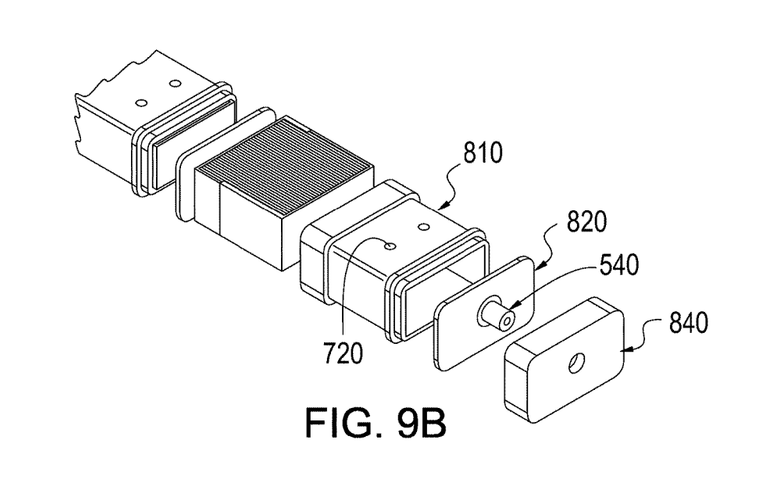

As shown in FIG. 9A-B, the battery module may be fitted with an anode connector 530 which is electrically connected with the floating interconnect 820 of a battery cell on one end of the battery module and a cathode connector 540 connected to the floating interconnect 820 of the battery cell on the opposite end of the battery module. The anode connector 530 and cathode connector 540 may be used to connect a plurality of battery modules in a variety of series and parallel arrangements to form a battery pack with desired voltage and capacity characteristics.

The series of battery cells may be bonded together, floating interconnect to die stack to floating interconnect and so on. To maintain good electrical and thermal connection axially along the battery module, the series of battery cells may be preloaded using axial compression spring 850, as shown in FIG. 9A. Alternate means of preloading include bands, stretched housing, long rods, compressed gas, elastomers, and other methods known to those of ordinary skill in the art.

Figure 9C:
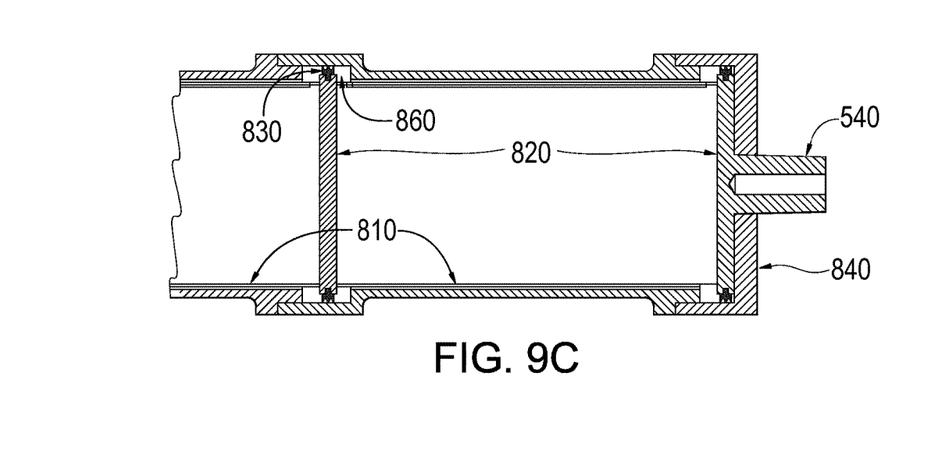

FIG. 9C provides a close-up, cross-sectional view of the connection of successive battery cell enclosure 810 and the end caps 840 and the insertion of floating interconnects 820 with elastomeric seals 830 to separate the individual battery cells. The connection of successive battery cell enclosures may define a recess 860 configured to retain an edge of a floating interconnect 820. The floating interconnects 820 may define a periphery and include an elastomeric seal 830 around the periphery of the interconnect, which permits the interconnect to translate in an axial direction while maintaining a separation of the electrolyte between adjacent battery cells. The recess 860 may be configured to limit the axial travel of the floating interconnect 820.

The result is a module or pack with improved performance as compared to a conventional cell with a similar energy density. The pack or module of certain embodiments of the invention will have higher energy density and thermal performance than conventional systems. Enhanced thermal conduction from the center of the cells to the side of the battery can allow the module exterior surfaces to run at higher temperatures and/or simplify active cooling requirements.

It is well known to those of skill in the art that improving thermal performance will have a significant positive effect on cycle life and calendar life of the battery.

Theorecitcal Results

Figure 10:
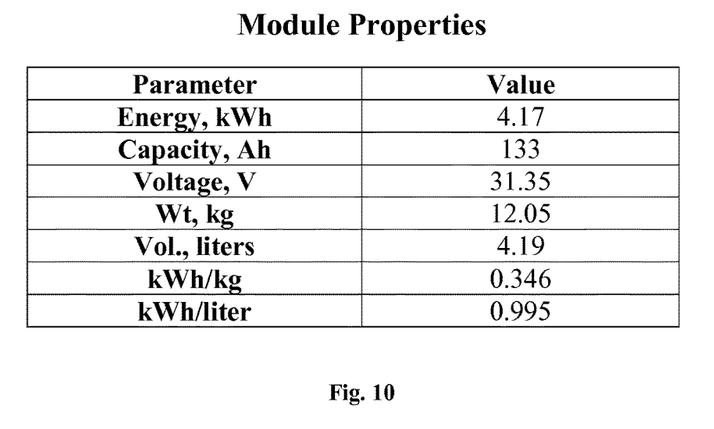
FIG. 10 depicts experimental results for battery modules, according to certain embodiments of the invention.
Figure 11:
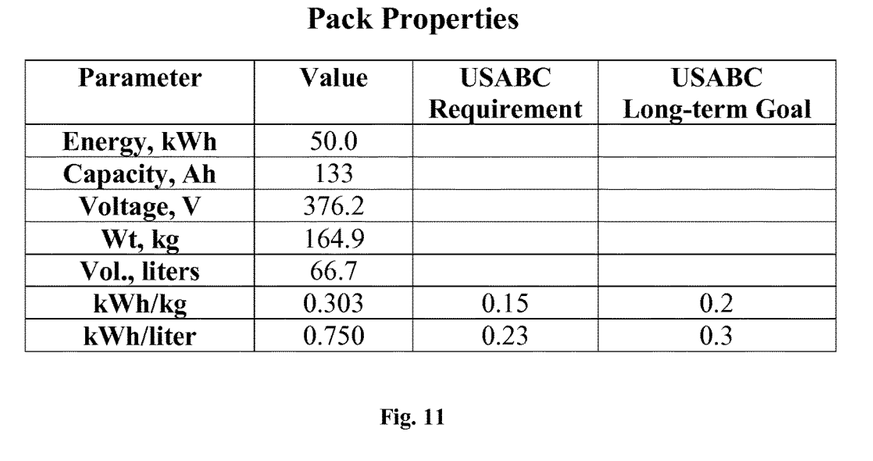
FIG. 11 depicts experimental results for a battery pack, according to certain embodiments of the invention.

The expected performance of each module has been modeled in detail using the Battery Design Studio software to model the cell and then model the module and pack. The modeled cell may comprise a high-energy nickel, cobalt, manganese cathode and a silicon anode. Below is an example of the results obtained of modeling a 50 kW-hr pack using 12, 4.2 kW-hr modules. The cell design includes an assumption of 20% excess capacity (that means the total capacity of the pack is 60 kW-hr at full depth of discharge). The results for 12 modules integrated into a pack are shown in FIGS. 10 and 11.

The test cell when combined with the unique packaging options enabled by the architecture exceeds even the long term USABC energy density goals for an automobile battery pack.

Traditional packs have cell/pack weight ratios as low as 0.5. The direct consequence of this is high costs for the pack. For a pack based on our certain embodiments of the invention module architecture, this number is as much as 38% higher resulting in corresponding decrease in pack complexity and cost. This can be seen in the FIGS. 10 and 11. The 438 Whr/kg cell results in a 303 Whr/kg pack and a 0.69 cell/pack weight ratio, while the 1192 Whr/l cells results in a 750 Whr/l pack and a 0.63 cell/pack volume ratio. Nominal cell targets are slightly lower than the initial experimental results at 410 Whr/kg and 900 Wh/l cells resulting in 276 Whr/kg and 566 Whr/l packs and cell/pack ratios of 0.67 and 0.63 respectively.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, operation or operations, to the objective, spirit, and scope of the invention. All such modifications are intended to be within the scope of the claims appended hereto. In particular, while the methods disclosed herein have been described with reference to particular operations performed in a particular order, it will be understood that these operations may be combined, sub-divided, or re-ordered to form an equivalent method without departing from the teachings of the invention. Accordingly, unless specifically indicated herein, the order and grouping of the operations is not a limitation of the invention.

What is claimed is:

1. A battery module, comprising:
   a first enclosure and a second enclosure, the first and second enclosures being different enclosures,
   a first battery cell comprising a first plurality of stacked dies within the first enclosure, each die of the first plurality including a die anode current collector, a die cathode current collector, and an alternating series of interdigitated anode fingers and cathode fingers, each of the anode fingers adjoining and extending from the anode current collector, each of the cathode fingers adjoining and extending from the cathode current collector, the alternating series of interdigitated anode and cathode fingers extending in a first direction, the plurality of stacked dies being stacked in a second direction with a separator being between adjacent dies within the die stack that electrically isolates the anode fingers and cathode fingers of each die from the anode and cathode fingers of any adjacent die, the first and second directions being orthogonal to each other, each die of the first plurality haying cathode fingers and anode fingers that occupy a same plane, the plane being orthogonal to the second direction and parallel to the first direction;
   a first liquid electrolyte retained by the first enclosure;
   a first battery cell package anode plate having a first surface that is orthogonal to the first direction and parallel to the second direction, the first battery cell package anode plate surface being in contact with the die anode current collector of each of the first plurality of dies, wherein the first battery cell package anode plate is electrically and thermally conductive and forms part of the first enclosure that retains the first liquid electrolyte; and
   a first battery cell package cathode plate having a surface that opposes the first battery cell package anode plate first surface and is in contact with the die cathode current collector of each of the first plurality of dies, wherein the first battery cell package cathode plate is electrically and thermally conductive and forms part of the first enclosure that retains the first liquid electrolyte; and a second battery cell, including a second plurality of dies and a second liquid electrolyte within the second enclosure, each of the second plurality of dies including a die anode current collector and a die cathode current collector;

wherein a second surface of the first battery cell package anode plate is in contact with the die cathode current collector of each of the second plurality of dies, and wherein the first battery cell package anode plate forms part of the second enclosure that retains the second liquid electrolyte.

2. The battery module of claim 1, wherein the first battery cell package anode plate comprises electrically conductive carbon.

3. The battery module of claim 1, wherein the first battery cell package anode plate comprises a first metal laminate and a second metal laminate, the first metal laminate being in contact with the die anode current collector of each of the first plurality of dies, and the second metal laminate being in contact with the die cathode current collector of each of the second plurality of dies.

4. The battery module of claim 3, wherein the first metal laminate comprises nickel and the second metal laminate comprises aluminum.

5. The battery module of claim 1, wherein the first battery cell package anode plate defines a plate periphery and includes an elastomeric seal around the plate periphery.

6. The battery module of claim 1, further including a module housing that comprises an electrically insulative, but thermally conductive material that forms part of the first and second enclosures.

7. The battery module of claim 6, wherein the first battery cell package anode plate defines a plate periphery and includes a conductive extension that protrudes from the plate periphery through a hole in the module housing.

8. The battery module of claim 6, wherein the first battery cell package anode plate defines plate periphery and includes an elastomeric seal around the plate periphery, the elastomeric seal being in contact with the module housing.

9. The battery module of claim 1 wherein the first battery cell further comprises a conductive extension that is electrically connected to the battery cell and extends out of the first enclosure to facilitate monitoring of the first battery cell and balancing the first and second battery cells.

10. The battery cell of claim 1 wherein the enclosure is shaped generally as a rectangular block having six outer faces.

11. The battery cell of claim 1 wherein the first and second enclosures comprise a thermally conductive but electrically insulative material, the thermally conductive but electrically insulative material having a thermal conductivity greater than about 0.1 W/mK and an electrical resistivity greater than about $10^{12}$ ohm-cm.

12. A battery module, comprising:

a battery module casing constructed of a thermally conductive but electrically insulative material, the thermally conductive but electrically insulative material having a thermal conductivity greater than about 0.1 W/mK and an electrical resistivity greater than about $10^{12}$ ohm-cm. p1 a series of compartments within the casing, arranged in a row in a first direction, each compartment in the series comprising an enclosure and a plurality of stacked dies and a liquid electrolyte within the enclosure, each of the dies comprising a die anode current collector, a die cathode current collector separated from the die anode current collector in the first direction, and an alternating series of interdigitated anode fingers and cathode fingers, each of the anode fingers adjoining and extending from the anode current collector, each of the cathode fingers adjoining and extending from the cathode current collector, the alternating series of interdigitated anode and cathode fingers extending in the first direction, the plurality of stacked dies being stacked in a second direction with a separator being between adjacent dies within the die stack that electrically isolates the anode fingers and cathode fingers of each die from the anode and cathode fingers of any adjacent die, the first and second directions being orthogonal to each other, each die of the plurality of stacked dies having cathode fingers and anode fingers that occupy a same plane, the plane being orthogonal to the second direction and parallel to the first direction; and a population of electrically and thermally conductive battery cell package plates separating the compartments, each member of the population having two opposing sides separating two immediately adjacent compartments in the series, wherein one of the opposing sides serves as a battery cell package anode plate for and is in electrical and thermal contact with the anode current collectors of the dies in one of the two immediately adjacent compartments and the other of the opposing sides serves as a battery cell package cathode plate for and is in electrical and thermal contact with the cathode current collectors of the dies in the other of the two immediately adjacent compartments, the electrically and thermally conductive battery cell package plates forming a respective part of the enclosure of the immediately adjacent compartments they separate, and isolating the liquid electrolyte in the immediately adjacent compartments they respectively separate.

13. The battery module of claim 12, wherein the battery cell package plates comprise a metal sheet having a plurality of dimple protrusions.

14. The battery module of claim 12, wherein the battery cell package plates comprise an aluminum sheet having a plurality of dimple protrusions.

15. The battery module of claim 12 wherein each of the anode fingers comprises a silicon backbone that conducts heat from the anode fingers to the anode current collector and each of the cathode fingers comprises a silicon backbone that conducts heat from the cathode fingers to the cathode current collector.

16. The battery module of claim 12 wherein the battery enclosure comprises an enclosure comprises a thermally conductive but electrically insulative material, the thermally conductive but electrically insulative material having a thermal conductivity greater than about 0.1 W/mK and an electrical resistivity greater than about $10^{12}$ ohm-cm.

* * * * *